United States Patent
Laptyeva et al.

(10) Patent No.: US 12,046,758 B2
(45) Date of Patent: *Jul. 23, 2024

(54) BATTERY ELECTRODE FOIL FOR THE PRODUCTION OF LITHIUM-ION ACCUMULATORS

(71) Applicant: Speira GmbH, Grevenbroich (DE)

(72) Inventors: Galyna Laptyeva, Alfter (DE); Ulrich Hampel, Grevenbroich (DE); Volker Denkmann, Kempen (DE)

(73) Assignee: Speira GmbH, Grevenbroich (DE)

( * ) Notice: Subject to any disclaimer, the term of this patent is extended or adjusted under 35 U.S.C. 154(b) by 534 days.

This patent is subject to a terminal disclaimer.

(21) Appl. No.: 16/760,301

(22) PCT Filed: Nov. 20, 2018

(86) PCT No.: PCT/EP2018/081890
§ 371 (c)(1),
(2) Date: Apr. 29, 2020

(87) PCT Pub. No.: WO2019/101723
PCT Pub. Date: May 31, 2019

(65) Prior Publication Data
US 2020/0328426 A1    Oct. 15, 2020

(30) Foreign Application Priority Data
Nov. 21, 2017  (DE) .................. 10 2017 127 436.7

(51) Int. Cl.
*C22C 21/00* (2006.01)
*C22F 1/04* (2006.01)
*H01M 4/66* (2006.01)

(52) U.S. Cl.
CPC ............. *H01M 4/662* (2013.01); *C22C 21/00* (2013.01); *C22F 1/04* (2013.01)

(58) Field of Classification Search
None
See application file for complete search history.

(56) References Cited

U.S. PATENT DOCUMENTS

| | | | |
|---|---|---|---|
| 2014/0205900 A1 | 7/2014 | Seki et al. | |
| 2015/0248973 A1* | 9/2015 | Suzuki | H01M 4/70 148/695 |
| 2020/0266449 A1 | 8/2020 | Laptyeva et al. | |

FOREIGN PATENT DOCUMENTS

| | | |
|---|---|---|
| CN | 101671786 | 3/2010 |
| CN | 104220614 A | 12/2014 |

(Continued)

OTHER PUBLICATIONS

Isoyama et al., (1985) "Surface Physical Properties and Adhesion Functions of Aluminum Materials", Light Metals, vol. 35, No. 3, p. 176-187.

(Continued)

*Primary Examiner* — Zhongqing Wei
(74) *Attorney, Agent, or Firm* — Rudy J. Ng; Carol L. Francis; Bozicevic, Field & Francis LLP

(57) ABSTRACT

The invention relates to a battery electrode foil comprising an aluminium alloy, wherein the aluminium alloy has the following composition in % by weight: Si: 0.01-0.15% by weight, Fe: 0.02-0.4% by weight, Cu: ≤0.08% by weight, Mn: ≤0.03% by weight, Mg: ≤0.03% by weight, Cr: ≤0.01% by weight, Ti: 0.005-0, 03% by weight, wherein the aluminium alloy can contain impurities up to a maximum of 0.05% in each case, in total up to a maximum of 0.15%, the remaining % by weight being aluminium, the proportion of aluminium however being at least 99.35% by weight; wherein the battery electrode foil has intermetallic phases with a diameter length of 0.1 to 1.0 μm with a density of ≤9500 particles/mm². The invention further relates to a method for the production of a battery electrode foil, its use (Continued)

for the production of accumulators, and accumulators containing the battery electrode foil.

10 Claims, 4 Drawing Sheets

(56) References Cited

FOREIGN PATENT DOCUMENTS

| | | |
|---|---|---|
| CN | 104245980 A | 12/2014 |
| CN | 104357722 A | 2/2015 |
| CN | 105063520 | 11/2015 |
| CN | 106929713 | 7/2017 |
| DE | 112013005772 | 8/2015 |
| DE | 112013005208 | 9/2015 |
| EP | 2738850 | 1/2015 |
| EP | 2738849 | 7/2015 |
| EP | 2857535 | 11/2018 |
| JP | 2014-205886 | 10/2014 |
| JP | 2014205886 A * | 10/2014 |

OTHER PUBLICATIONS

Speira GMBH; JP Office Action for JP 2020-545456 "Battery Electrode Foil for the Production of Lithium-Ion Accumulators", Feb. 22, 2022, 9 pages English Translation 11 pages.

* cited by examiner

BATTERY ELECTRODE FOIL FOR THE PRODUCTION OF LITHIUM-ION ACCUMULATORS

FIELD OF INVENTION

The invention relates to a battery electrode foil comprising an aluminium alloy, the aluminium alloy having the following composition in % by weight: Si: 0.01-0.15% by weight, Fe: 0.02-0.4% by weight, Cu: ≤0.08% by weight, Mn: ≤0.03% by weight, Mg: ≤0.03% by weight, Cr: ≤0.01% by weight, Ti: 0.005-0.03% by weight, wherein the aluminium alloy can contain impurities up to a maximum of 0.05% in each case, up to a maximum of 0.15% in total, the remaining % by weight being aluminium, but the proportion of aluminium must be at least 99.35% by weight; wherein the battery electrode foil has intermetallic phases with a diameter length of 0.1 to 1.0 μm with a density of ≤9500 particles/mm². The invention also relates to a method for producing a battery electrode foil, its use for the production of accumulators, and accumulators containing the battery electrode foil.

TECHNOLOGICAL BACKGROUND

Lithium-ion accumulators in their core consist of alternating anode and cathode layers arranged one above the other and separated by separator layers. For the cathode layers, aluminium foil coated with Li-containing electrode paste is typically used. The anode layer can be a graphite-coated copper foil, for example, and the separator layer can be a polymer layer permeable to Li ions.

In the cathode layer, the aluminium foil serves on the one hand as a carrier or substrate for the electrode paste and on the other hand to dissipate the current, i.e. as a so-called current collector.

Against this background, the present invention is based on the object of providing a battery electrode foil as well as a method for producing a battery electrode foil with good or high conductivity in the smallest possible thickness with two approximately equal surfaces.

SUMMARY OF THE INVENTION

To solve this problem, a battery electrode foil comprising an aluminium alloy is provided, wherein the aluminium alloy has the following composition in weight percent:
Si: 0.01-0.15% by weight,
Fe: 0.02-0.4% by weight,
Cu: ≤0.08% by weight,
Mn: ≤0.03% by weight,
Mg: ≤0.03% by weight,
Cr: :≤0.01% by weight,
Ti: 0.005-0.03% by weight,
wherein the aluminium alloy can contain impurities of up to a maximum of 0.05% in each case and up to a maximum of 0.15% in total,
the remaining weight % being aluminium,
but the aluminium content must be at least 99.35% by weight;
wherein the battery electrode foil has intermetallic phases of a diameter length of 0.1 to 1.0 μm with a density of ≤9500 particles/mm².

The inventors recognized that by processing the above-mentioned aluminium alloy adapted to the specific alloy composition, an aluminium foil can be provided which is characterised by a low density of the phase of a diameter length of 0.1 to 1.0 μm and has good or high electrical conductivity.

Preferred embodiments refer to battery electrode foil whose intermetallic phases have a diameter length of 0.1 to 1.0 μm with a density of ≤7000 particles/mm².

The battery electrode foils according to the invention are therefore characterised in particular by good or high electrical conductivity and at the same time good or high mechanical strength. The battery electrode foil can have a minimum electrical conductivity of >56% IACS, in particular of approximately 56% to 63% IACS. Furthermore, the battery electrode foil can have a tensile strength (in the direction of rolling and transverse to the direction of rolling) of Rm>165 MPa.

Typically, the battery electrode foil shows a surface roughness Ra of 0.07 to 0.22 μm on both sides. Preferably, the difference in surface roughness Ra on both sides of the battery electrode foil is 0.03 μm maximum.

In particular, the battery electrode foil has a carbon coating of <5 mg/m². In some designs the surface tension of the battery electrode foil is >30 dyn/cm, such as >32 dyn/cm.

Usually the battery electrode foil has a thickness of 8 to 20 μm, preferably 12 μm.

The battery electrode foil, especially with a thickness of 12 μm, can exhibit the following mechanical properties:
Rm (in rolling direction): ≥165 MPa,
Rm (transverse to rolling direction): ≥165 MPa,
Rp0.2 (in rolling direction): ≥110 MPa,
A100 (in rolling direction): ≥1.0%.

Another aspect of the invention relates to a method for manufacturing a battery electrode foil (12, 22),
in which an aluminium hot strip (8) with a hot strip thickness of at least 2.5 mm is provided from an aluminium alloy as described in claims 1, 10 and 11, and
in which the aluminium hot strip (8) is cold rolled in several cold rolling passes (K1, Kx, Kx+1, Ky, Ky+1, Kn) to a final thickness of 8 to 20 μm,
wherein cold rolling is carried out from an initial thickness of at least 1 mm without intermediate annealing.

Typically, cold rolling from hot strip thickness to final thickness is carried out without intermediate annealing.

The inventors recognized that the processing of the aluminium alloy described above by a method that is not continuous casting, in particular by the method described above, aluminium foils, in particular battery electrode foils, can be produced with good or high mechanical strength and good or high conductivity.

In particular, the method involves cold rolling to a final thickness of 8 to a maximum of 20 μm, preferably 12 μm.

In some embodiments, the degree of rolling per cold rolling pass from an initial thickness of at least 0.55 mm, preferably at least 1.5 mm, is at most 60%.

In particular embodiments of the method, the aluminium strip with a thickness of at least 0.1 mm, preferably at least 0.2 mm, is cooled between two cold rolling passes, in particular to a temperature not exceeding 50° C.

The aluminium strip can be cold-rolled in one layer up to its final thickness.

Consequently, a further aspect of the invention relates to a battery electrode foil manufactured according to the method described herein.

A further aspect of the invention relates to the use of a battery electrode foil as a current collector foil, in particular for the manufacture of an accumulator, in particular a lithium-ion accumulator.

Another aspect of the invention relates to an accumulator, in particular a lithium-ion accumulator, with a current collector consisting of a battery electrode foil of the invention.

DESCRIPTION OF PREFERRED EMBODIMENTS

Figure 1:
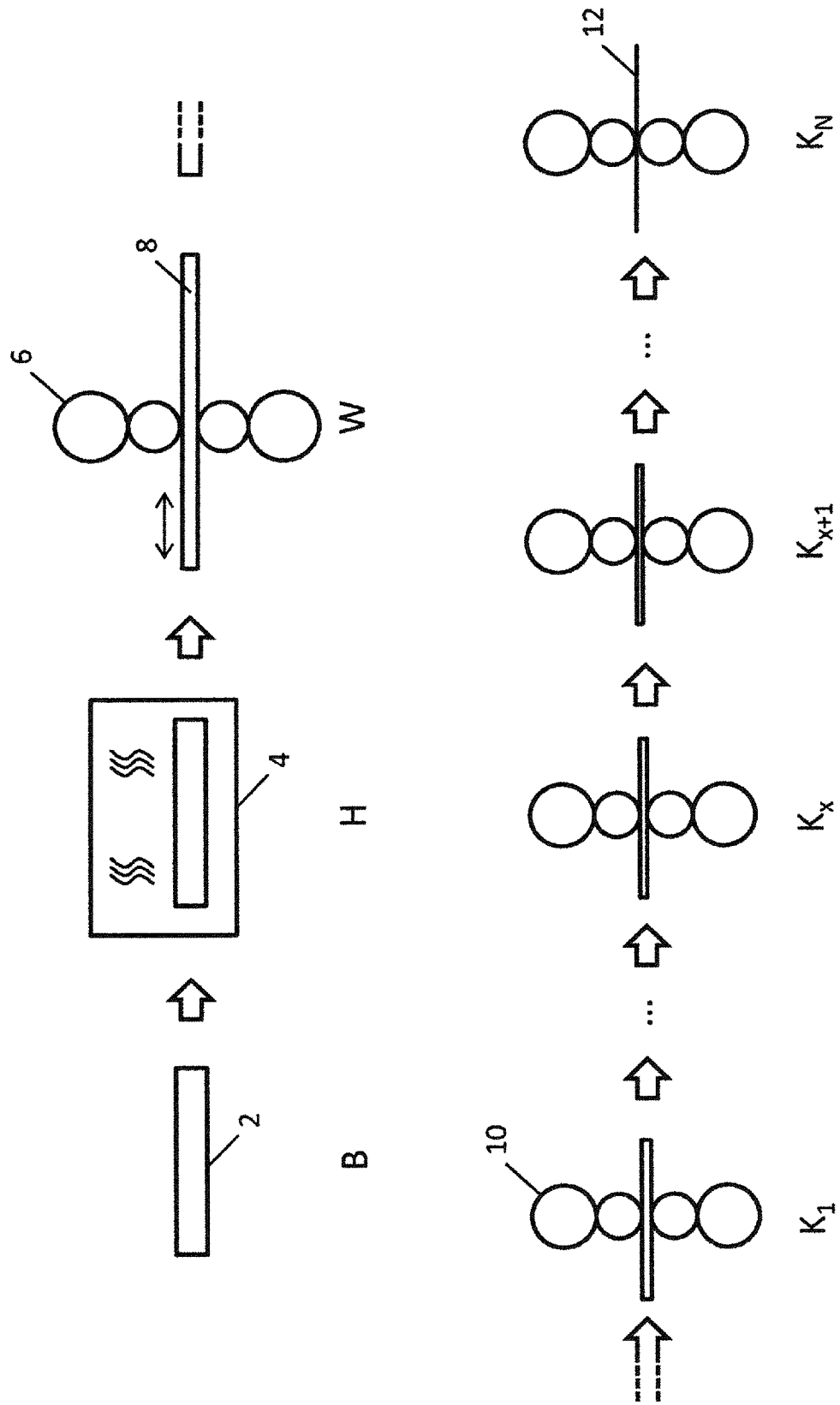
FIG. 1 First embodiment of the method according to the invention

It should be noted that "comprising" does not exclude other elements or steps and "a" or "an" does not exclude a multitude. It should also be noted that features or steps described in reference to one of the embodiments can also be used in combination with other features or steps of other described embodiments.

It was found that from the aluminium alloy, aluminium foil can be produced by the described processing which is characterised by a low density of phases with a diameter length of 01. to 1.0 μm and a high conductivity. This makes these aluminium foils particularly suitable as battery electrode foils for the manufacture of accumulators, especially lithium-ion accumulators.

The aluminium alloy has a silicon content of 0.01 to 0.15% by weight and an iron content of 0.02 to 0.4% by weight. These ranges have been shown to be suitable for the desired properties of an aluminium foil made from the aluminium alloy.

The aluminium alloy also has a copper content of <0.08% by weight, a manganese content of <0.03% by weight, a magnesium content of ≤0.03% by weight, a chromium content of ≤0.01% by weight and a titanium content of 0.005 to 0.03% by weight. It was found that by the precise joint adjustment of the elements Cu, Ti, Mn, Mg and Cr in the respective ranges indicated, a low-alloy aluminium alloy is obtained which can nevertheless be solidified well by cold forming, in particular by foil rolling.

In addition, due to their solubility limits, Cu and Mn, but also Si, remain largely in solution, i.e. in the aluminium matrix, and exert a reactive force on static and dynamic recovery. With the stated contents for Cu, Mn and Si, this allows a continuous increase in strength through work hardening. Furthermore, the described composition leads to a better thermostability of the aluminium foil, since the softening of the aluminium foil during heat treatment is inhibited by the dissolved elements.

According to the invention, the above-mentioned problem is further solved by a method for producing an aluminium foil, in particular a battery electrode foil, in which an aluminium hot strip with a hot strip thickness of at least 3 mm is provided from the aluminium alloy described above and in which the aluminium hot strip is cold-rolled in several cold-rolling passes to a final thickness of at least 8 and at most 20 μm, the cold-rolling being carried out from an initial thickness without intermediate annealing. Furthermore, according to the invention, the problem is solved by an aluminium foil produced by this method.

Foil rolling without intermediate annealing of the alloy according to the invention results in higher strength in combination with good electrical conductivity. Phase analysis shows that this embodiment has a low density of phases with a diameter length of 0.1 to 1.0 μm.

Therefore, a major aspect of the invention is to provide a battery electrode foil comprising an aluminium alloy,
wherein the aluminium alloy has the following composition in weight percent:
Si: 0.01-0.15% by weight,
Fe: 0.02-0.4% by weight,
Cu: ≤0.08% by weight,
Mn: ≤0.03% by weight,
Mg: ≤0.03% by weight,
Cr: ≤0.01% by weight,
Ti: 0.005-0.03% by weight,
wherein the aluminium alloy can contain impurities of up to a maximum of 0.05% in each case and up to a maximum of 0.15% in total,
the remaining weight % being aluminium,
but the aluminium content must be at least 99.35% by weight;
wherein the battery electrode foil has intermetallic phases of a diameter length of 0.1 to
1.0 μm with a density of ≤9500 particles/mm$^2$.

The diameter lengths specified here refer to the maximum diameter lengths of the particles. The particles are shown as two-dimensional particles in the scanning electron microscope images. The longest diameter to be detected in this two-dimensional representation represents the maximum diameter length.

The skilled person is familiar with methods for determining the diameter length of the intermetallic phases. For example, the diameter length can be measured using a field emission scanning electron microscope (Zeiss Merlin) with B2D4 detector (pneumatically operated detector for field emission scanning electron microscope) at a magnification of 1000:1 and an acceleration voltage of 10 kV.

Another embodiment refers to a battery electrode foil comprising an aluminium alloy, wherein the aluminium alloy has the following composition in weight percent:
Si: ≤0.1% by weight,
Fe: ≤0.12% by weight,
Cu: ≤0.03% by weight,
Mn: ≤0.02% by weight,
Mg: ≤0.02% by weight,
Zn: ≤0.03% by weight,
Ti: 0.017-0.020% by weight,
wherein the aluminium alloy can contain impurities of up to a maximum of 0.01% in each case and up to a maximum of 0.15% in total,
the remaining weight % being aluminium,
but the aluminium content must be at least 99.80% by weight;
wherein the battery electrode foil has intermetallic phases of a diameter length of 0.1 to 1.0 μm with a density of ≤7000 particles/mm$^2$; in particular, such a battery electrode foil having a strip thickness of ≤20 μm can have intermetallic phases of a diameter length of 0.1 to 1.0 μm with a density of ≤7000 particles/mm$^2$; in particular, such a battery electrode foil having a strip thickness of ≤12 μm can have intermetallic phases of a diameter length of 0.1 to 1.0 μm with a density of ≤4000 particles/mm$^2$; in particular, such a battery electrode foil with a strip thickness of ≤20 μm can have intermetallic phases of a diameter length of 0.1 to 1.0 μm with a density of ≤4000 particles/mm² (measured at a magnification of 1000× and an acceleration voltage of 10 kV); in particular, such a battery electrode foil with a strip thickness of ≤12 μm can have intermetallic phases of a diameter length of 0.1 to 1.0 μm with a density of ≤2000 particles/mm² (measured at a magnification of 1000× and an acceleration voltage of 10 kV).

Another embodiment refers to a battery electrode foil comprising an aluminium alloy, wherein the aluminium alloy has the following composition in weight percent:

Si: 0.1-0.15% by weight,
Fe: 0.3-0.4% by weight,
Cu: ≤0.05% by weight,
Mn: ≤0.01% by weight,
Mg: ≤0.0029% by weight,
Cr: ≤0.01,
Zn: ≤0.05% by weight,
Ti: ≤0.03% by weight,
wherein the aluminium alloy can contain impurities of up to a maximum of 0.015% in each case and up to a maximum of 0.05% in total,
the remaining weight % being aluminium,
but the aluminium content must be at least 99.35% by weight;
wherein the battery electrode foil has intermetallic phases of a diameter length of 0.1 to 1.0 μm with a density of ≤7000 particles/mm²; in particular, such a battery electrode foil having a strip thickness of ≤9 μm can have intermetallic phases of a diameter length of 0.1 to 1.0 μm with a density of ≤1000 particles/mm²; in particular, such a battery electrode foil with a strip thickness of ≤9 μm can have intermetallic phases of a diameter length of 0.1 to 1.0 μm with a density of ≤1000 particles/mm²; in particular, such a battery electrode foil with a strip thickness of ≤9 μm can have intermetallic phases of a diameter length of 0.1 to 1.0 μm with a density of ≤600 particles/mm² (measured at a magnification of 1000× and an acceleration voltage of 10 kV).

Typically, the battery electrode foil has an intermetallic phase of a diameter length of 0.1 to 1.0 μm with a density of at least 100 particles/mm², at least 1000 particles/mm².

In particular embodiments, the battery electrode foil has an intermetallic phase of a diameter length of ≥1.0 μm with a density of at least 2000 particles/mm². In particular, a battery electrode foil with a strip thickness of ≤12 μm can exhibit intermetallic phases with a diameter length of ≥1.0 μm with a density of at least 3000 particles/mm², preferably at least 4000 particles/mm².

In particular, battery electrode foil with a strip thickness of ≤15 μm, the intermetallic phases can have a diameter length of ≥1.0 μm with a density of at least 3000 particles/mm², preferably at least 4000 particles/mm².

The specified particle densities were measured at a magnification of 1000:1 and an acceleration voltage of 10 kV.

It was found that an aluminium strip made of the alloy described above can be strengthened by cold rolling from a thickness of at least 3 mm to a minimum of 8 and a maximum of 20 μm in such a way that good strength values can be achieved. The aluminium foil produced by this method thus exhibits increased strength with good or high conductivity.

As a result, aluminium foil is particularly suitable for the manufacture of accumulators, especially lithium-ion accumulators. Accordingly, the above-mentioned problem is further solved, according to the invention, by using the above-mentioned aluminium alloy for the manufacture of accumulators, in particular lithium-ion accumulators, as well as by using the above-mentioned aluminium foil as current collector foil, in particular for the manufacture of an accumulator, in particular a lithium-ion accumulator. In addition, the above-mentioned problem is solved by an accumulator, in particular a lithium-ion accumulator, with a current collector made of the aluminium foil described above.

The method provides a hot-rolled aluminium strip with a hot-rolled thickness of at least 3 mm made of the above-mentioned alloy. The hot strip thickness is understood to be the thickness of the aluminium strip that is reached at the end of hot rolling. The aluminium hot strip can be produced, for example, by casting an ingot from a melt with the aforementioned alloy composition and hot rolling it to a thickness of 3 mm or more after an optional homogenisation treatment. The hot strip temperature, i.e. the temperature of the hot strip immediately after the last hot strip pass, is typically in the range between 300° C. and 350° C., for example 330° C.

The hot-rolled aluminium strip is cold-rolled in several cold rolling passes to a final thickness of 8 to a maximum of 20 μm. The number of cold rolling passes can be adjusted as required, but is preferably at least seven.

Cold rolling is carried out from an initial thickness of at least 1 mm, preferably at least 2 mm, in particular at least 3 mm, without intermediate annealing. This means that the aluminium strip with a thickness of at least 1 mm, preferably at least 2 mm, in particular at least 3 mm, is not (no longer) subjected to intermediate annealing between two cold rolling passes. Preferably, no intermediate annealing is carried out from hot strip thickness onwards, i.e. cold rolling is preferably carried out completely without intermediate annealing.

The initial thickness is understood to be the thickness of the aluminium strip before the relevant cold rolling pass. A pass is understood to be the single rolling of a strip.

Intermediate annealing leads to an at least partial recrystallization of the aluminium strip or to a reduction of dislocations and counteracts material hardening. By dispensing with intermediate annealing from a certain initial thickness onwards, good hardening can be achieved through the strong forming of the strip, so that the aluminium strip or aluminium foil has good strength at final thickness.

In the following, different types of aluminium alloy, the method, the aluminium foil, its use and the accumulator are described. The individual embodiments are applicable to the aluminium alloy, the method, the aluminium foil, its use and the accumulator and can also be combined with each other.

In a further embodiment of the method, the hot strip thickness is in the range of 3-5 mm With a minimum hot strip thickness of 4 mm, it was possible to achieve good work hardening during subsequent cold rolling to the desired final thickness. Preferably, cold rolling is carried out from hot strip thickness without intermediate annealing. At a hot strip thickness of more than 5 mm, the hot strip is difficult to handle, in particular to coil.

In another embodiment, cold rolling from hot strip thickness to final thickness is carried out without intermediate annealing. In this embodiment, intermediate annealing between the cold rolling passes is therefore generally dispensed with, irrespective of the initial thickness. In this way, improved hardening of the aluminium strip can be achieved by cold rolling.

For another embodiment, cold rolling is carried out to a final thickness of 8 to 20 μm, preferably a maximum of 15

μm, in particular a maximum of 10 to 12 μm. For a corresponding embodiment of the aluminium foil, the latter has a thickness of 8 to 20 μm, preferably a maximum of 15 μm, in particular a maximum of 12 μm. The alloy described above can be used to produce aluminium foils of small thickness, which nevertheless have good or high strength so that they do not tear when further processed into accumulators. This saves material and weight and increases the energy density of the accumulators.

In the case of a further embodiment, the degree of rolling per cold rolling pass is at most 60% from an initial thickness of at least 0.7 mm, preferably from an initial thickness of at least 1.5 mm. The degree of rolling per cold rolling pass is thus limited to a maximum of 60% before the initial thickness falls below a value of 0.7 mm or preferably 1.5 mm.

The degree of rolling A of a cold rolling pass is the change in thickness due to the cold rolling pass, i.e. the difference between the strip thickness after the cold rolling pass $d_{after}$ and the initial thickness $d_{before}$, in relation to the initial thickness $d_{before}$, expressed as a percentage:

$$A=(d_{before}-d_{after})/d_{before}$$

If, for example, the strip is rolled from 200 μm to 100 μm in a cold rolling pass, the degree of rolling results in: A=(200 μm-100 μm)/200 μm=0.5=50%.

It was found that the heat input caused by cold rolling can heat the aluminium strip to such an extent that significant softening occurs. This is prevented by limiting the degree of rolling to a maximum of 60% from an initial thickness of at least 0.7 mm, preferably at least 1.5 mm, so that better strengths of the strip at final thickness can be achieved.

In another embodiment, the aluminium strip is cooled from a thickness of at least 0.1 mm, preferably at least from a thickness of at least 0.2 mm, between two cold rolling passes, in particular to a temperature not exceeding 50° C. In this way, the thermal energy introduced into the strip by the cold rolling method can be dissipated between the individual cold rolling passes so that the temperature of the aluminium strip does not rise excessively over several cold rolling passes, which would lead to the strip becoming softer. As a result, higher strengths at final thickness can be achieved. As the heat rise per cold rolling pass is critical, especially for thinner strip thicknesses, the method is carried out by starting the cooling step between two cold rolling passes before the initial thickness falls below 0.7 mm, preferably 1.5 mm.

To cool the aluminium strip, it can be stored between two cold rolling passes, for example, for at least 24 hours, preferably at room temperature. This allows the strip to be cooled from typically 80° C. to 100° C. to a maximum of 50° C. immediately after a cold rolling pass.

In another embodiment, the aluminium strip is cold-rolled in a single layer to its final thickness. This means that the aluminium strip is not doubled, even with thin starting thicknesses, as is usually the case in the production of aluminium foil. As a result of the single-layer cold rolling to final thickness, the aluminium foil has a similar texture on both sides, in particular comparable roughness, which has a positive effect on the uniform coatability of the aluminium foil.

In addition, single layer rolling to final thickness can reduce the amount of rolling oil required compared to double rolled aluminium foil, as double layer rolling requires a considerable amount of rolling oil to be applied between the two aluminium layers in order to separate them after rolling. Single-layer rolling thus allows organic impurities on the strip surface to be reduced, preferably to a residual rolling oil coating of no more than 5 mg carbon per square meter, which has proved advantageous when using the aluminium foil for the manufacture of lithium-ion accumulators.

In a further embodiment, the aluminium foil, especially with a maximum thickness of 12 μm, has the following mechanical properties, especially in the roll-hardened state:
Rm (in rolling direction): ≥165 MPa,
Rm (transverse to rolling direction): ≥165 MPa,
Rp0.2 (in rolling direction): ≥110 MPa,
A100 (in rolling direction): ≥1.0%.

Rm is the tensile strength, Rp0.2 the 0.2% yield strength and A100 the elongation at break (with sample length 100 mm), each measured in a tensile test according to DIN 50154:1980-12 and DIN EN 546-2:2007-03.

The addition "in rolling direction" means that one tensile sample each with the sample length in rolling direction shall be used and the addition "transverse to rolling direction" means that one tensile sample each with the sample length transverse to rolling direction shall be used.

It was found that by using the alloy and method described above, a foil can be produced which has the above mentioned mechanical properties.

It was found that with the alloy described, a high thermal stability of the aluminium foil can be achieved, so that the aluminium foil has good mechanical properties even after such heat treatment. This is particularly advantageous when using the aluminium foil for the production of lithium-ion accumulators, since the aluminium foil has good strength values even after a drying method following coating with lithium-containing electrode material.

In another embodiment, the aluminium foil has a roughness value Ra in the range of 0.07 to 0.22 μm on both sides, measured according to DIN EN ISO 4287:2010 (with a stationary roughness tester Hommel-Tester T8000 RC). Preferably, the roughness value Ra on one side of the aluminium foil differs from the roughness value Ra on the other side of the aluminium foil by a maximum of 0.03 μm. This can be achieved in particular by rolling the aluminium foil in one layer to final thickness. In this way, the aluminium foil can be coated more evenly on both sides.

In another version, the aluminium foil has an electrical conductivity ≥56% IACS (International Annealed Copper Standard), determined by measuring resistance using a Wheatstone bridge. In this way, the aluminium foil is well suited for current collectors. In special embodiments, the electrical conductivity is between 55% and 63%.

Further features and advantages of the present invention result from the following description of various embodiments, with reference to the attached Figure.

FIG. 1 shows a first embodiment of the method according to the invention.

In the method, an ingot 2 with the following composition is first cast in step B:
Si: 0.07-0.12% by weight
Fe: 0.18-0.24% by weight
Cu: 0.03-0.08% by weight
Mn: 0.015-0.025% by weight
Zn: ≤0.01% by weight
Ti: 0.015-0.025% by weight
Al: Rest, but at least 99.5% by weight,
unavoidable impurities individually ≤0.01% by weight, in total ≤0.03% by weight.

The ingot can then be subjected to an optional homogenisation treatment in a homogenisation furnace 4 (step H). After the homogenizing treatment, the ingot is hot-rolled in a reversing hot rolling mill 6 (indicated by the double arrow in FIG. 1) to form aluminium hot strip 8 with a hot strip thickness of between 3 and 5 mm (Step W).

After hot rolling, the aluminium hot strip 8 is cold-rolled in a cold rolling stand 10 in several cold rolling passes to a final thickness of for example 15 μm. FIG. 1 shows an example of the first cold rolling pass (step K1), the last cold rolling pass (step $K_N$, where "N" stands for the total number of cold rolling passes) and two successive cold rolling passes (steps $K_x$ and $K_{x+1}$) between the first and last cold rolling passes. After cold rolling pass $K_x$, the aluminium strip has a thickness of at least 1 mm. The initial thickness for cold rolling pass $K_{x+1}$ is therefore 1 mm or more. Cold rolling pass $K_{x+1}$ follows cold rolling pass $K_x$ without intermediate annealing of the aluminium strip. Likewise, all further cold rolling passes follow each other until the last cold rolling pass without intermediate annealing. In this way, a high degree of solidification of the produced aluminium foil 12 is achieved via the individual cold rolling passes starting at $K_x$, without any intermediate annealing between the cold rolling passes resulting in a softening of the foil. Preferably, intermediate annealing is completely dispensed with during cold rolling. In addition, the degree of rolling of the individual cold rolling passes is limited to a maximum of 60% from an initial thickness of at least 1.5 mm.

Figure 2:
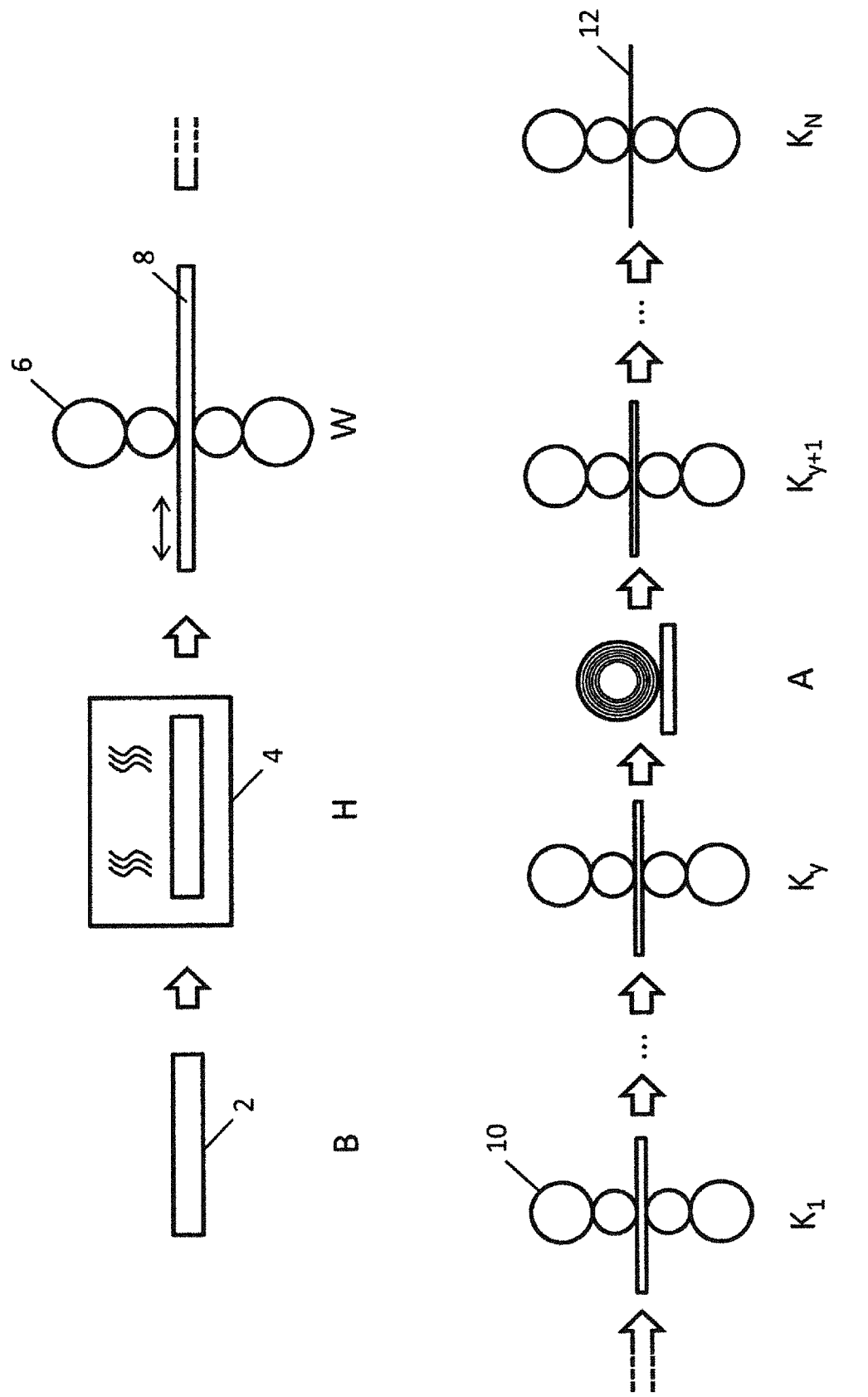
FIG. 2 Second embodiment of the method according to the invention

FIG. 2 shows an alternative embodiment of the procedure according to the invention, whereby identical components are provided with identical reference numbers. As with the method in FIG. 1, there is no intermediate annealing from an initial thickness of at least 1 mm and the degree of rolling is limited to a maximum of 60% from an initial thickness of at least 1.5 mm. The embodiment shown in FIG. 2 differs from the embodiment in FIG. 1 in that a cooling step A is provided between the individual cold rolling passes from a strip thickness of 0.1 mm (illustrated in FIG. 2 between $K_y$ and $K_{y+1}$).

Due to the forming energy introduced into the aluminium strip during cold rolling, the aluminium strip typically has a temperature in the range of 80° C.-100° C. immediately after a cold rolling pass. In cooling step A, the strip is stored as a coil at room temperature for a period of at least 24 hours and thus cools slowly to a temperature of less than 50° C. This avoids excessive heating of the aluminium strip over several successive cold rolling passes and the associated softening of the aluminium strip. As a result, the strength of the aluminium foil 12 at final thickness can be increased.

The aluminium foils produced with the method described above are particularly suitable for use as current collectors in the manufacture of lithium-ion accumulators.

Figure 3:
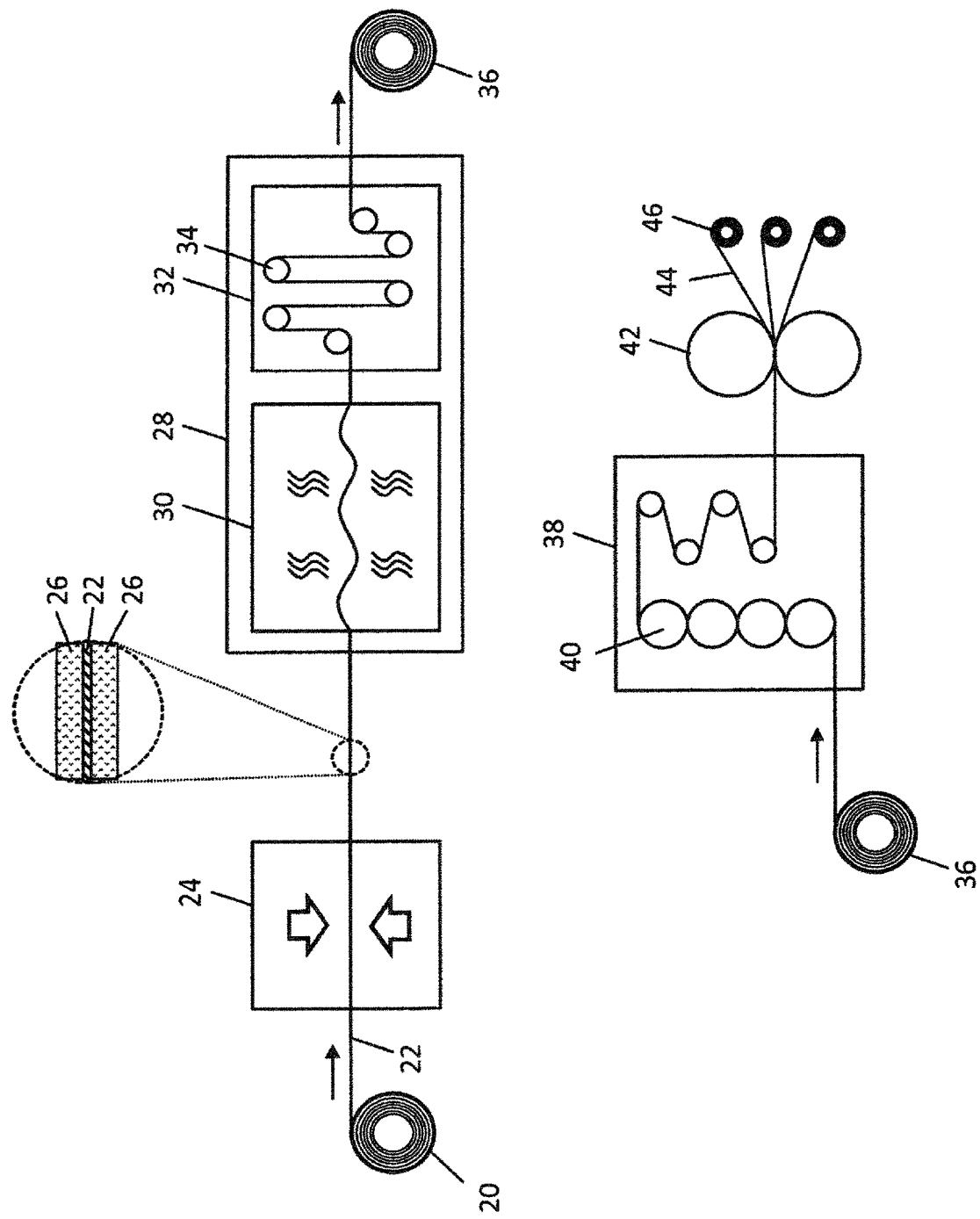
FIG. 3 Section of a method for the manufacture of lithium-ion accumulators

FIG. 3 illustrates the production of cathode layers for lithium-ion accumulators, from which the mechanical requirements for aluminium foil 12 can be seen.

In this method, an aluminium foil 22 is unwound from a coil 20, which serves as a carrier for the electrode material and current collector. The aluminium foil 22 can, for example, be produced using the method shown in FIG. 1 or FIG. 2, e.g. foil 12.

The aluminium foil 22 is first fed to a coating device 24, in which the top and bottom sides of the foil are coated with a lithium-containing electrode material, for example by slot die coating. The coating 26 applied to the aluminium foil can have a layer thickness of up to 150 μm, which is many times the thickness of the aluminium foil 22.

The coated foil 22 is then fed to a drying device 28, in which the foil is first dried in a flotation dryer 30 and then cooled again in a cooling section 32, for example with cooling rollers 34. Drying is typically carried out in the air flotation dryer for 2 minutes at approx. 150° C. After cooling, the aluminium foil is wound into a coil 36.

Due to the large amount of electrode material applied to the aluminium foil, a good or high strength of the aluminium foil is desirable so that it does not tear, especially in the air flotation dryer 30. In addition, the aluminium foil should have sufficient thermal stability so that the required strength is still present after the drying treatment, i.e. after 2 min. at 150° C.

In a second method stage, the coated aluminium foil 22 is unwound again from coil 36 and passed through a calendering device 38, in which the coated aluminium foil 22 is pressed between calendar rolls 40 to obtain a predetermined uniform thickness of coating 26.

The coated foil is then slit longitudinally into narrower strips 44 in a slitting device 42 and wound up into coils 46. The strips of coated aluminium foil produced in this way are cut or punched to the desired geometry in the following steps not shown and further processed into lithium-ion accumulators by stacking them on top of each other alternately with anode layers and separator layers arranged in between. This can be done for the manufacture of lithium-ion accumulators in flat design by successive stacking of the individual layers on top of each other or for the manufacture of lithium-ion accumulators in cylindrical design by winding a stack of one cathode and one anode layer each with separator layers.

Figure 4B:
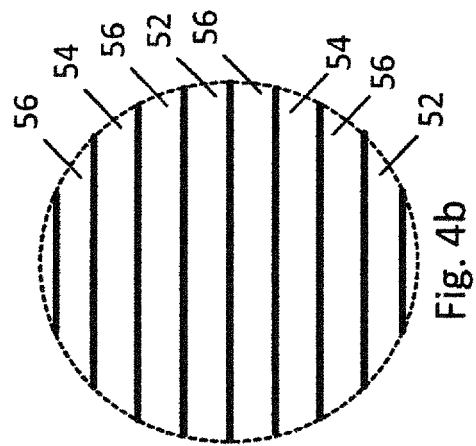
FIG. 4*a-b* Schematic diagram of the layer structure of a lithium-ion accumulator in flat design
Figure 4A:
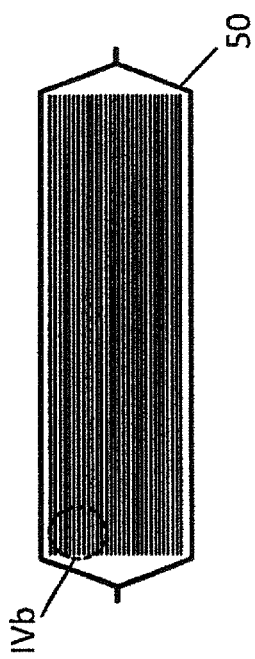

FIG. 4a-b schematically shows the layered structure of a lithium-ion accumulator 50 in flat design in sectional view, with FIG. 4b showing an enlarged detail from FIG. 4a. The accumulator 50 has a stack of cathode layers 52, anode layers 54 and separator layers 56 arranged in between. The cathode layers 52 are made of the coated aluminium strip 44 shown in FIG. 3.

For this purpose, rolling ingots with a thickness of 45 mm were cast from the alloys A, B and C listed in Table 1, whereby A and B represent an embodiment according to the invention of the alloy and C a comparative example.

TABLE 1

| Composition Alloy A | |
|---|---|
| Element | weight % |
| Si | 0.05 |
| Fe | 0.1 |
| Cu | 0 |
| Mn | 0 |
| Mg | 0 |
| Zn | 0.01 |
| Ti | 0.01 |
| Ga | 0.01 |
| V | 0.006 |
| Pb | 0.001 |
| Al | Rest |

TABLE 2

| Composition Alloy B | |
|---|---|
| Element | weight % |
| Si | 0.12 |
| Fe | 0.38 |
| Cu | 0 |
| Mn | 0.0057 |
| Mg | 0.0016 |
| Cr | 0 |
| Zn | 0.01 |
| Ti | 0.005 |

TABLE 2-continued

Composition Alloy B

| Element | weight % |
|---|---|
| B | 0.009 |
| Ca | 0.0001 |
| Na | 0.0004 |
| Pb | 0.0013 |
| V | 0.0064 |
| Ga | 0.0126 |
| Al | Rest |

TABLE 3

Composition Alloy C

| Element | weight % |
|---|---|
| Si | 0.06 |
| Fe | 0.86 |
| Cu | 0 |
| Mn | 0.018 |
| Mg | 0.0008 |
| Cr | 0 |
| Ni | 0.004 |
| Ti | 0.009 |
| B | 0.0005 |
| Na | 0.0001 |
| Pb | 0.0013 |
| Sn | 0.0004 |
| V | 0.0068 |
| Ga | 0.0149 |
| Al | Rest |

Samples of strips with a thickness of 9, 12 μm and 20 μm the number of phases with a maximum diameter length of 0.1-1.0 μm and a maximum diameter length of >1 μm was determined.

The samples were mechanically prepared with an oxide polishing suspension. The maximum diameter lengths were determined with a field emission scanning electron microscope (Zeiss Merlin) with B2D4 detector (pneumatically operated detector for field emission scanning electron microscope) at a magnification of 1000:1 and an acceleration voltage of 10 kV. The results for particles with a maximum diameter length of 0.1-1.0 μm are shown in Table 4:

TABLE 4

| Alloy | Thickness | Number of phases (max. diameter length 0.1-1.0 μm/mm$^2$ |
|---|---|---|
| A | 12 μm | $2 \times 10^3$ |
| A | 20 μm | $4 \times 10^3$ |
| B | 9 μm | $0.6 \times 10^3$ |
| C | 12 μm | $25 \times 10^3$ |
| C | 9 μm | $35 \times 10^3$ |

The results for particles with a diameter length>1.0 μm are shown in Table 5:

TABLE 5

| Alloy | Thickness | Number of phases (max. diameter length > 1.0 μm)/mm$^2$ |
|---|---|---|
| A | 12 μm | $2 \times 10^3$ |
| A | 20 μm | $3 \times 10^3$ |
| B | 9 μm | $0.2 \times 10^3$ |
| C | 12 μm | $22 \times 10^3$ |
| C | 9 μm | $24 \times 10^3$ |

The invention claimed is:

1. A battery electrode foil comprising an aluminium alloy, wherein the aluminium alloy has the following composition in weight percent:
Si: 0.01-0.15 weight percent,
Fe: 0.02-0.4% by weight,
Cu: ≤0.08% by weight,
Mn: ≤0.03% by weight,
Mg: ≤0.03% by weight,
Cr: ≤0.01% by weight,
Ti: 0.005-0.03% by weight,
wherein the aluminium alloy can contain impurities of up to a maximum of 0.15%,
wherein the remaining weight % are aluminium,
but the aluminium content must be at least 99.35% by weight;
wherein the battery electrode foil has intermetallic phases of a diameter length of 0.1 to 1.0 μm with a density of ≤9500 particles/mm$^2$,
wherein said battery electrode foil has a surface roughness Ra of 0.07 to 0.22 μm on both sides, and
wherein the difference in surface roughness Ra on both sides of the battery electrode foil is at most 0.03 μm.

2. The battery electrode foil according to claim 1, wherein the battery electrode foil has a minimum electrical conductivity of 56% to 63% International Annealed Copper Standard (IACS).

3. The battery electrode foil according to claim 1, wherein the battery electrode foil has a tensile strength in rolling direction and transverse to the rolling direction of Rm>165 MPa, respectively.

4. The battery electrode foil according to claim 1, wherein the battery electrode foil has a carbon coverage of <5 mg/m$^2$.

5. The battery electrode foil according to claim 1, wherein the surface tension of the battery electrode foil is >30 dyn/cm.

6. The battery electrode foil according to claim 5, wherein the surface tension of the battery electrode foil is >32 dyn/cm.

7. The battery electrode foil according claim 1, wherein the battery electrode foil has a thickness of 8 to 20 μm.

8. The battery electrode foil according to claim 1,
wherein the battery electrode foil has the following mechanical properties:
tensile strength Rm in rolling direction: ≥165 MPa,
tensile strength Rm transverse to the rolling direction: ≥165 MPa,
yield strength Rp0.2 in rolling direction: ≥110 MPa,
elongation A100 in rolling direction: ≥1.0%.

9. A method of manufacturing of an accumulator, the method comprising:
using a battery electrode foil according to claim 1 as a current collector foil.

10. An accumulator having a current drain made of a battery electrode foil according to claim 1.

* * * * *